United States Patent
Kremer et al.

(10) Patent No.: US 8,494,747 B2
(45) Date of Patent: Jul. 23, 2013

(54) METHOD AND DEVICE FOR STABILIZING A SINGLE-TRACK MOTOR VEHICLE

(75) Inventors: Michael Kremer, Gross-Zimmern (DE); Hans Georg Ihrig, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 640 days.

(21) Appl. No.: 12/529,856

(22) PCT Filed: Feb. 28, 2008

(86) PCT No.: PCT/EP2008/052434
§ 371 (c)(1),
(2), (4) Date: Sep. 3, 2009

(87) PCT Pub. No.: WO2008/113666
PCT Pub. Date: Sep. 25, 2008

(65) Prior Publication Data
US 2010/0023235 A1    Jan. 28, 2010

(30) Foreign Application Priority Data

Mar. 16, 2007 (DE) .......................... 10 2007 013 365
Feb. 28, 2008 (DE) .......................... 10 2008 011 577

(51) Int. Cl.
*B60T 7/12*    (2006.01)
(52) U.S. Cl.
USPC .................... 701/83; 701/70; 701/78; 701/82
(58) Field of Classification Search
USPC .......................................... 701/70, 78, 82, 83
See application file for complete search history.

(56) References Cited

U.S. PATENT DOCUMENTS

| | | | | |
|---|---|---|---|---|
| 5,386,366 A | * | 1/1995 | Roll et al. | 701/70 |
| 5,444,625 A | * | 8/1995 | Tanaka et al. | 701/90 |
| 5,445,443 A | | 8/1995 | Hauser et al. | |
| 5,712,618 A | * | 1/1998 | McKenna | 340/475 |
| 7,469,975 B2 | * | 12/2008 | Wagner | 303/191 |

(Continued)

FOREIGN PATENT DOCUMENTS

| | | |
|---|---|---|
| DE | 38 03 563 A1 | 8/1989 |
| DE | 100 34 222 A1 | 1/2002 |

(Continued)

OTHER PUBLICATIONS

Quirant et al., Brake Control Method and Device for Motorcycle, Jun. 3, 2004, JPO, JP 2004-051091 A, English Abstract.*

(Continued)

*Primary Examiner* — Joseph Rocca
*Assistant Examiner* — James English
(74) *Attorney, Agent, or Firm* — RatnerPrestia

(57) ABSTRACT

A method for stabilizing an unstable driving state in a single-track vehicle, in particular a motorcycle, wherein a prespecified driving situation, in particular braking, particularly while driving in a straight trajectory or a nearly straight trajectory, is detected; at least one yaw rate ($\dot{\psi}$) and/or one side slip angle ($\beta$) of the vehicle is determined for the detection of an unstable driving state of the vehicle; the determined yaw rate ($\dot{\psi}$) and/or the determined side slip angle ($\beta$) is/are evaluated; and when an unstable driving stat is detected, the braking torque of one wheel, in particular the front wheel, is reduced. A device for stabilizing an unstable driving state in a single-track vehicle is also disclosed.

18 Claims, 2 Drawing Sheets

U.S. PATENT DOCUMENTS

| | | | |
|---|---|---|---|
| 2004/0098185 A1* | 5/2004 | Wang | 701/70 |
| 2005/0168059 A1 | 8/2005 | Nishikawa et al. | |
| 2006/0100766 A1* | 5/2006 | Schwarz et al. | 701/71 |
| 2006/0155457 A1 | 7/2006 | Waldbauer et al. | |
| 2006/0250022 A1* | 11/2006 | Hasegawa et al. | 303/139 |
| 2011/0024249 A1* | 2/2011 | Nishikawa et al. | 188/349 |
| 2011/0043031 A1* | 2/2011 | Nishikawa et al. | 303/137 |

FOREIGN PATENT DOCUMENTS

| | | |
|---|---|---|
| DE | 102 32 362 A1 | 1/2004 |
| DE | 102 35 378 A1 | 2/2004 |
| DE | 103 16 351 A1 | 10/2004 |
| DE | 10 2005 003 255 A1 | 8/2005 |
| DE | 10 2005 054 557 A1 | 5/2006 |
| DE | 10 2006 002 399 A1 | 10/2006 |
| DE | 10 2005 047 143 A1 | 4/2007 |
| DE | 10 2005 047 145 A1 | 4/2007 |
| DE | 10 2006 061 483 A1 | 8/2007 |
| EP | 0 548 985 B1 | 12/1992 |
| EP | 0 603 612 A1 | 12/1993 |
| JP | 2001180462 A * | 7/2001 |
| JP | 2004-504206 A * | 2/2004 |
| JP | 2008-520494 A * | 6/2008 |
| WO | WO 2004/041613 A1 | 5/2004 |

OTHER PUBLICATIONS

Quirant et al., Brake Control Method and Device for Motorcycle, Jun. 3, 2004, JPO, JP 2004-051091 A, Machine translation of Description.*

Kremer et al., Method for Preventing Rollover in Motorcycles, Jun. 19, 2008, JPO, JP 2008-520494 A, Machine translation of Description.*

Werner Frie, Method and Device for Stabilizing a Road Vehicle, Feb. 12, 2004, JPO, JP 2004-504206 A, Machine Translation of Description.*

Arndt et al., Stabilization Method and Device for Motorcycle, Feb. 19, 2004, JPO, JP 2004-051091 A, Machine translation of Description.*

Seto et al., Braking Device for Motorcycle, Jul. 3, 2001, JPO, JP 2001-180462 A, English Abstract.*

* cited by examiner

METHOD AND DEVICE FOR STABILIZING A SINGLE-TRACK MOTOR VEHICLE

CROSS REFERENCE TO RELATED APPLICATIONS

This application is the U.S. national phase application of PCT International Application No. PCT/EP2008/052434, filed Feb. 28, 2008, which claims priority to German Patent Application No. DE 10 2007 013 365.2, filed Mar. 16, 2007 and German Patent Application No. DE 10 2008 011 577.0, filed Feb. 28, 2008, the contents of such applications being incorporated by reference herein.

BACKGROUND OF THE INVENTION

1. Field of the Invention

The invention relates to a method and device for stabilizing a motorcycle.

2. Description of the Related Art

In the course of the last few decades, the motorcycle has graduated from being a cost-effective means of locomotion into a leisure vehicle in which emphasis is increasingly being placed on the safety and the comfort of the driver.

As was the case with automobiles several years ago, motorcycles are also increasingly being equipped with anti-lock brake systems (ABS). EP 0 548 985 B1 discloses, for example, an anti-lock brake device for motorcycles.

In the context of motorcycles, an "integral brake system" is understood to be a brake system in which activation of the handbrake lever or of the footbrake lever additionally causes the brake of the second brake circuit to be applied. It is therefore possible to actuate both brakes by activating a single activation element. Integral brake systems for motorcycles are known, for example, from DE 38 03 563 A1 and DE 103 16 351 A1.

Owing to the increased safety and/or the improved comfort it is to be expected that in future integral brakes will be used to an ever greater degree in motorcycles, said integral brakes assisting the driver in performing the braking operation through an active buildup of pressure at the front wheel and/or rear wheel, therefore ensuring an optimized braking distance.

DE 10 2005 003 255 A1 discloses a brake system for motorcycles, which brake system ensures the functionality of ABS and an integral brake in a structurally simple design.

In the case of straight-ahead braking, unstable driving states, which cannot be detected by an anti-lock brake system and correspondingly compensated, can occur in a motorcycle for various reasons. A number of examples will be given below in an exemplary fashion. On the one hand, in the case of a strong braking operation, the rear wheel is relieved of loading. The less ground contact the rear wheel has, the fewer lateral guidance forces it can transmit. The motorcycle is then relatively sensitive to interference influences. As a result of, for example, side wind or unevennesses in the roadway, the rear part of the motorcycle may veer off laterally, or the vehicle may be excited to oscillate. Furthermore, a rear wheel which is over-braked, even if only briefly, can also cause the motorcycle to yaw.

SUMMARY OF THE INVENTION

The invention related to the object of proposing a method and a device with which unstable driving states are detected and eliminated at an early time in a single-track motor vehicle.

The term "oscillation" is understood according to aspects of the invention to mean, in a generalized fashion, swinging or self-oscillation of the motorcycle about a vertical axis. This includes, for example, oscillation about the steering axis which can occur in the case of braking operations.

The invention relates to the idea of detecting an unstable driving state which occurs during a predefined driving situation by evaluating the yaw rate and/or the attitude angle of the vehicle, and of eliminating/stabilizing, or at least partially stabilizing, said driving state by reducing the brake pressure at a wheel brake.

Precisely one driving situation is preferably predefined, but it is also possible to predefine two or more driving situations. The driving situation or situations is/are detected on the basis of driving dynamics variables and/or variables of vehicle systems.

The predefined driving situation is expediently a braking operation since in the case of braking operations there is the risk of the rear wheel lifting off or of over-braking of the rear wheel, which can lead to yawing of the vehicle. A brake pressure in a wheel brake is particularly preferably considered for the purpose of detecting the predefined driving situation/situations in order to detect a braking operation driving situation.

The predefined driving situation is preferably a straight-ahead braking operation or approximately straight-ahead braking operation, since in this driving situation unstable driving states often occur, for example owing to the greater relieving of the loading on the rear wheel, and stabilization of these unstable driving states therefore contributes greatly to improving the driving safety.

Since, in the case of a braking operation of a motorcycle, the greatest portion of the braking force is usually transmitted via the front wheel, the brake pressure is preferably reduced at the front wheel in order to stabilize the driving state as quickly as possible.

As a result of the reduction of the braking torque at the front wheel, the rear wheel usually regains a relatively strong ground contact so that the latter can transmit more braking force again. For this reason, according to one preferred embodiment of the method according to aspects of the invention, the braking torque at the rear wheel is increased together with or after the reduction in the braking torque at the front wheel.

The unstable driving state is detected by considering the yaw rate and/or the attitude angle. If the unstable driving state is oscillation of the motorcycle, this unstable driving state is preferably detected from the fact that the signal of the yaw rate and/or the signal of the attitude angle exhibits a periodic or approximately periodic time profile over a predefined time period, since this directly represents the oscillating movement (swinging) of the motorcycle about the steering axis.

Alternatively or additionally, an oscillating movement of the motorcycle is preferably detected from the fact that the signal of the yaw rate and/or the signal of the attitude angle pass/passes through a predefined number of zero crossings or crossings through the mean value. As a result, oscillation can also be detected if the signal of the yaw rate and/or the signal of the attitude angle exhibits a time profile which is not very periodic, i.e. is irregular in terms of frequency and/or amplitude.

If the unstable state relates less to oscillation but rather more to veering off of the rear part of the vehicle, the unstable state is preferably detected from the fact that the value of the attitude angle exceeds a predefined threshold value. This detection possibility is particularly preferably ensured by the fact that the yaw rate is additionally considered. If the yaw rate exhibits a constant or approximately constant time profile, a constant or approximately constant value corresponds thereto and the change in the attitude angle is therefore a non-swinging one.

However, if the value of the attitude angle exceeds a predefined threshold value, this may also be due to an oscillation with a large amplitude, with the result that in this case an unstable state is also present, and said unstable state is detected and stabilized by reducing the brake pressure at the front wheel brake.

An unstable state is also preferably detected if the change in the yaw rate over time exceeds a predefined threshold value since rapid veering off of the rear part of the vehicle is then occurring.

According to one preferred embodiment of the method according to aspects of the invention, the magnitude (amount) and/or the time profile of the reduction in the braking torque at the wheel are/is implemented as a function of the yaw rate and/or the attitude angle. As a result, a situation-specific reduction in the braking torque is possible, which permits the driving stability to be restored as quickly as possible without, however, leading to overcompensation, e.g. underbraking, as a result of excess reduction in the braking torque.

The frequency of the signal of the yaw rate and/or of the attitude angle and/or the amplitude of the signal of the yaw rate and/or of the attitude angle are/is preferably used to dimension the reduction in the brake pressure in order to assess the degree of instability of the state and to implement situation-specific stabilization. The reduction in the brake pressure is therefore particularly preferably carried out in such a way that, when the motorcycle oscillates with a frequency and/or an amplitude which is greater than a corresponding, predefined threshold value, a reduction in the brake pressure is carried out which is less than the reduction in the brake pressure when the motorcycle oscillates with a frequency and/or an amplitude which is less than the corresponding, predefined threshold value or a corresponding, predefined second threshold value.

It is also preferred, alternatively or additionally, to implement braking torque as a function of the amount of change in the yaw rate and/or the attitude angle over time and/or as a function of the value of the yaw rate and/or the attitude angle in order to carry out situation-dependent stabilization.

According to another preferred embodiment of the method according to aspects of the invention, the effect of the reduction in the braking torque on the yaw rate and/or the attitude angle is evaluated. The yaw rate and/or attitude angle are/is then used to decide whether and/or at what time a subsequent increase in the braking torque is to be carried out at the wheel. Alternatively or additionally, the yaw rate and/or attitude angle are/is used to dimension a subsequent increase in the braking torque at the wheel (magnitude of the increase in the brake pressure). These measures avoid a situation in which a renewed unstable driving state occurs.

The driving state of a braking operation is preferably detected on the basis of the value and/or the time profile of deceleration of the vehicle, and/or the value and/or the time profile of deceleration of the wheel, and/or the value and/or the time profile of at least one brake pressure. These variables are generally already available in an electronic brake system, with the result that no additional sensors and/or evaluation methods are necessary for this. This reduces the implementation costs of the invention.

Straight-ahead travel or approximately straight-ahead travel is preferably detected by considering the value and/or the time profile of a rolling angle of the vehicle, since this permits safe and reliable detection of straight-ahead travel.

Accordingly, the inventive device according to one preferred embodiment comprises a sensor with which a rolling angle is measured, and/or a means with which a rolling angle is determined from at least one sensor signal.

Alternatively or additionally, it is preferred to consider the value and/or the time profile of a lateral acceleration of the vehicle in order to detect straight-ahead travel or approximately straight-ahead travel. If the lateral acceleration is lower than a predefined threshold value, particularly preferably for a predefined time period, straight-ahead travel or approximately straight-ahead travel is detected.

The invention also relates to the use of a method according to aspects of the invention in a brake system for motorcycles.

The invention is concerned with the stabilization of (spontaneously) occurring unstable driving states in specific driving situations, not with the avoidance of unstable driving situations such as, for example, the avoidance of over-braking in a bend. When avoiding unstable driving situations, the brake control strategy is fixed in advance and all that is necessary is to observe that the driving situation develops in the direction of the unstable driving situation and the brake control operation can then be carried out preventatively. In the invention, preventative control is not possible since unstable driving states may or may not occur in the predefined driving situation. Only after an unstable driving state has been detected is a brake control operation carried out in order to (partially) eliminate the unstable driving state.

Furthermore, the control strategy of the invention is not dependent on the stability of the rotational state of the wheel/wheels (slip state), while when avoiding unstable driving situations (for example avoiding over-braking in a bend) an unstable wheel rotational behavior is to be avoided. According to one exemplary embodiment of the method according to aspects of the invention, "rolling" of the motorcycle in the case of a stable wheel rotational behavior of the front wheel and a high braking power is detected and eliminated at an early time.

An advantage of the invention is the increased driving stability, in particular in the case of straight-ahead braking operations, and the associated increased driving safety. Swinging (oscillation) of the motorcycle about the steering axis or lateral veering off of the rear part of the motorcycle can be detected at an early time and suitable measures implemented in order to terminate the unstable driving state.

BRIEF DESCRIPTION OF THE DRAWINGS

Further preferred embodiments of the invention emerge from the following description on the basis of figures.

DETAILED DESCRIPTION OF THE PREFERRED EMBODIMENTS

Figure 1:
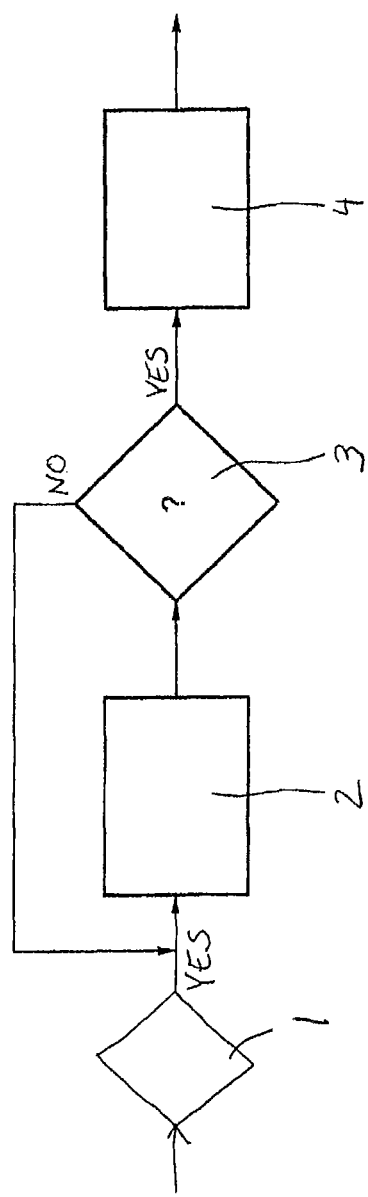
FIG. 1 shows a schematic illustration of an exemplary method.
Figure 2:
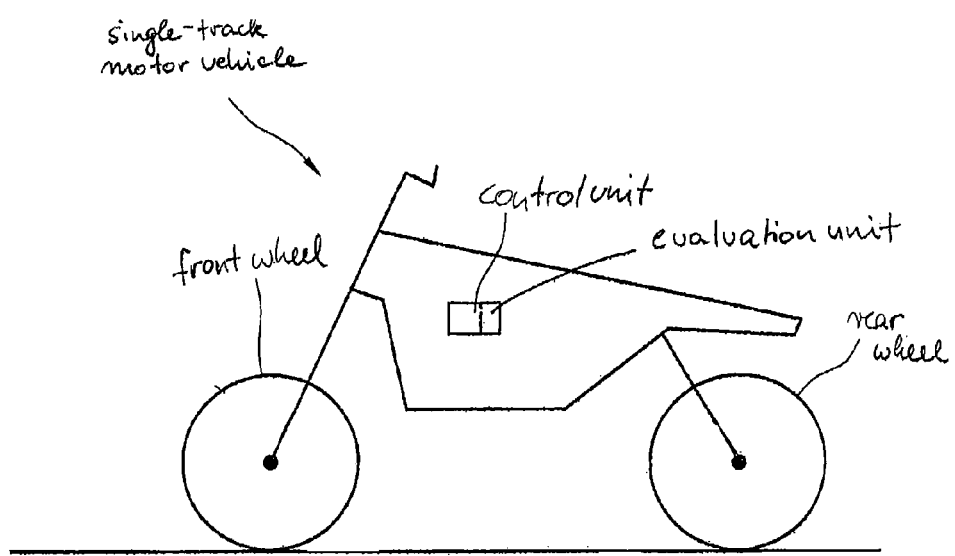
FIG. 2 shows a diagram of an exemplary single-track motor vehicle.

FIG. 1 is a schematic illustration of an exemplary method. In block 1 it is decided whether a predefined driving situation is, for example, a braking operation in the case of straight-ahead travel or approximately straight-ahead travel. If this is the case (branch JA in block 1), the yaw rate $\dot{\psi}$ and/or the attitude angle $\beta$ of the motorcycle are/is determined in block 2 and are/is evaluated in order to detect an unstable vehicle state. On the basis of criteria it is decided in block 3 whether or not an unstable vehicle state is present. If an unstable vehicle state is detected (branch JA in block 3), in block 4 the braking torque at the front wheel is reduced to just such an extent that the driving stability is ensured. The method is therefore intended to serve to maintain the driving stability, for example in the case of straight-ahead braking.

For example, straight-ahead travel (block 1) is to be understood as meaning driving situations in which the rolling angle λ of the motorcycle is low, i.e. lower than a predefined threshold value (for example λ<10°). The rolling angle λ can be determined here by a suitable sensor system (rolling angle sensor) and/or evaluation software. A method for determining rolling angles is described, for example, in DE 10 2006 061 483 A1. Here, the rolling angle is determined by integrating a rolling rate (measured with a rotational speed sensor) or from a lateral acceleration and a vertical acceleration or from a yaw rate and a vertical acceleration. A combination of two or three of these methods is also possible.

A vehicle braking operation is detected, for example, by the electronic brake system of the motorcycle (block 1). For this purpose, the deceleration of the vehicle and/or deceleration values of the wheels and/or brake pressures, which are available to the brake system through measurement and/or calculation on the basis of models, are evaluated.

The yaw rate $\dot{\psi}$ and/or the attitude angle β of the motorcycle are/is used to detect unstable driving states (block 2). The yaw rate $\dot{\psi}$ can, for example, be measured by means of a rotational speed sensor. Such rotational speed sensors per se are already employed on a series-production basis within the scope of vehicle movement dynamics control systems in passenger cars. The attitude angle β can be determined, for example, by integrating the yaw rate $\dot{\psi}$. Likewise, other methods for determining an attitude angle β are known in the prior art, or the attitude angle β is measured using a sensor.

In order to detect unstable yawing (block 3), observation is carried out, for example, to determine whether a sufficient degree of swinging of the motorcycle about its steering axis occurs. Such swinging can be detected on the basis of the signal of the yaw rate $\dot{\psi}$ and/or the signal of the attitude angle β. The swinging is characterized, for example, by zero crossings in the signal of the yaw rate $\dot{\psi}$.

Furthermore, the presence of a sufficiently large attitude angle β (larger than a predefined threshold value) can also cause the system to reduce the braking torque at the front wheel in order to maintain driving stability. In this context, a zero crossing of the yaw rate signal $\dot{\psi}$ is not necessary, i.e. braking interventions can also occur due to a slow, non-swinging change in the attitude angle.

According to another exemplary embodiment, a targeted increase in the braking power at the rear wheel is additionally carried out in order to reduce the braking power at the front wheel (block 4). This corresponds to a change in the distribution of the braking force between the front wheel and the rear wheel.

According to a further exemplary embodiment, the type and magnitude of the reduction in the braking torque at the front wheel (block 4) is made dependent on the dynamics of the yaw oscillation and/or the magnitude of the attitude angle β. This means that, in the case of movements with a high frequency and/or large amplitude, a relatively large reduction in the brake pressure is selected, and, in the case of movements with a low frequency and/or small amplitude, a small reduction in the brake pressure is selected.

Additionally or alternatively, the dynamics of the stabilization occurring after the reduction in the brake pressure are used to suitably dimension the following increase in brake pressure. This is intended to avoid an unstable driving state occurring again.

Unstable driving states can occur for various reasons. A number of examples are mentioned below:

If a method for detecting lifting off of a rear wheel or for preventing rollover, such as is known for example from DE 10 2005 054 557 A1, is configured for a maximum braking power, the rear wheel is relieved of loading just to such an extent that it does not lift off. However, it is then also no longer able to transmit lateral guidance forces. Under optimum conditions, the maximum braking force can therefore actually only be transmitted via the front wheel brake. However, the motorcycle is then relatively sensitive to interference influences. It is therefore possible, for example, for side wind or unevennesses in the roadway to excite the rear part of the motorcycle so that it veers off laterally, or to lead to oscillation of the vehicle. An increase in the driving stability through a corresponding configuration of the electronic brake system (EBS), for example by means of different threshold values for the detection of lifting off of the rear wheel, would be obtained at the expense of the maximum braking power under optimum conditions (level roadway, no side wind, etc.), and is therefore not to be recommended.

A rear wheel which is overbraked, even if only briefly, can also lead to yawing of the motorcycle.

The stabilization measure is applied, for example, in driving situations in which the motorcycle starts to yaw and/or oscillate owing, for example, to a low level of ground contact of the rear wheel during braking.

The invention claimed is:

1. A method for stabilizing an unstable driving state in a single-track motor vehicle, said method comprising the steps of:
   detecting a predefined driving situation comprising a braking operation during straight-ahead or approximately straight-ahead travel,
   determining at least one yaw rate ($\dot{\psi}$) and/or one attitude angle (β) of the vehicle during the predefined driving situation,
   detecting the unstable driving state of the vehicle by evaluating the determined yaw rate ($\dot{\psi}$), the determined attitude angle (β), or both the determined yaw rate ($\dot{\psi}$) and the determined attitude angle (β), and
   reducing a braking torque of at least one wheel only after detecting an occurrence of the unstable driving state during the predefined driving situation.

2. The method as claimed in claim 1, wherein, when the occurrence of the unstable driving state is detected, a distribution of the braking force between a front wheel of the at least one wheel and a rear wheel of the at least one wheel of the vehicle is changed.

3. The method as claimed in claim 1, wherein, when the occurrence of the unstable driving state is detected, the braking torque at a rear wheel of the at least one wheel is increased in addition to a reduction in the braking torque at a front wheel of the at least one wheel of the vehicle.

4. The method as claimed in claim 1, wherein the unstable driving state is detected if a signal of the yaw rate ($\dot{\psi}$) and/or a signal of the attitude angle (β) exhibits a periodic or approximately periodic time profile for a predefined time period.

5. The method as claimed in claim 1, wherein the unstable driving state is detected if a signal of the yaw rate ($\dot{\psi}$) and/or a signal of the attitude angle (β) pass/passes through a predefined number of zero crossings or crossings through a mean value.

6. The method as claimed in claim 1, wherein the unstable driving state is detected if a value of the attitude angle (β)

exceeds a predefined threshold value in the case of a constant or approximately constant value of the yaw rate ($\dot{\psi}$).

7. The method as claimed in claim 1, wherein the unstable driving state is detected if a change in the yaw rate ($\ddot{\psi}$) over time exceeds a predefined threshold value.

8. The method as claimed in claim 1, wherein an amount and/or a time profile of a reduction in the braking torque at the at least one wheel of the vehicle are/is implemented as a function of the yaw rate ($\dot{\psi}$) and/or the attitude angle ($\beta$).

9. The method as claimed in claim 8, wherein the braking torque at the wheel is reduced as a function of:
   (i) a frequency of a signal of the yaw rate ($\dot{\psi}$) and/or of the attitude angle ($\beta$),
   (ii) an amplitude of the signal of the yaw rate ($\dot{\psi}$) and/or of the attitude angle ($\beta$),
   (iii) an amount of change in the yaw rate and/or the attitude angle over time,
   (iv) the value of the yaw rate ($\dot{\psi}$) and/or the attitude angle ($\beta$), or
   (v) any combination of (i), (ii), (iii), and (iv).

10. The method as claimed in claim 1, wherein an effect of the reduction in the braking torque on the yaw rate ($\dot{\psi}$) and/or the attitude angle ($\beta$) is evaluated and is used to define and/or dimension a subsequent increase in the braking torque at the wheel.

11. The method as claimed in claim 1, wherein the braking operation is detected by considering:
   (i) a value and/or time profile of deceleration of the vehicle,
   (ii) a value and/or time profile of deceleration of the wheel,
   (iii) a value and/or time profile of at least one brake pressure, or
   (iv) any combination of (i), (ii) and (iii).

12. The method as claimed in claim 1, wherein the straight-ahead travel or approximately straight-ahead travel is detected by considering a value and/or a time profile of a rolling angle ($\lambda$) and/or of a lateral acceleration of the vehicle.

13. The method as claimed in claim 12, wherein the straight-ahead travel or approximately straight-ahead travel is detected by considering the value and/or the time profile of a rolling angle ($\lambda$), and the straight-ahead travel or approximately straight-ahead travel is detected if the rolling angle ($\lambda$) is smaller than a predefined threshold value for a predefined time period.

14. A device for stabilizing an unstable driving state in a single-track motor vehicle having a brake system which comprises a control unit for regulating at least one brake pressure of a wheel brake, said device comprising:
   means for detecting a predefined driving situation comprising a braking operation during straight-ahead or approximately straight-ahead travel;
   at least one sensor for measuring at least one yaw rate ($\dot{\psi}$) and/or one attitude angle ($\beta$) during the predefined driving situation, and/or means for determining at least one yaw rate ($\dot{\psi}$) and/or one attitude angle ($\beta$) during the predefined driving situation from at least one sensor signal,
   an evaluation unit configured to detect the unstable driving state of the vehicle by evaluating the yaw rate ($\dot{\psi}$) and/or the attitude angle ($\beta$), and
   the control unit in which, only after the occurrence of the unstable driving state during the predefined driving situation is detected, a control signal is generated which brings about a reduction in a braking torque of at least one wheel.

15. The device as claimed in claim 14, wherein said device comprises at least one sensor with which at least one rolling angle ($\lambda$) is measured, and/or means for determining at least one rolling angle ($\lambda$) from at least one sensor signal,
   wherein the rolling angle ($\lambda$) is used in the means for detecting the predefined driving situation for the purpose of detecting the straight-ahead travel or approximately straight-ahead travel of the vehicle.

16. The use of the method as claimed in claim 1 in a brake system for motorcycles.

17. The method as claimed in claim 1, wherein the single track vehicle is a motorcycle.

18. The method as claimed in claim 1, wherein the reducing step comprises reducing the braking torque of a front wheel of the at least one wheel.

\* \* \* \* \*